July 4, 1961

K. LEHOVEC 2,991,371

VARIABLE CAPACITOR

Filed June 15, 1959

INVENTOR.
KURT LEHOVEC
BY
Connolly and Hutz
HIS ATTORNEYS

July 4, 1961

K. LEHOVEC 2,991,371

VARIABLE CAPACITOR

Filed June 15, 1959

INVENTOR.
KURT LEHOVEC
BY *Connolly and Hutz*
HIS ATTORNEYS

INVENTOR.
KURT LEHOVEC

July 4, 1961

K. LEHOVEC 2,991,371

VARIABLE CAPACITOR

Filed June 15, 1959

INVENTOR.
KURT LEHOVEC
BY Connolly and Hutz
HIS ATTORNEYS

United States Patent Office 2,991,371
Patented July 4, 1961

2,991,371
VARIABLE CAPACITOR

Kurt Lehovec, Williamstown, Mass., assignor to Sprague Electric Company, North Adams, Mass., a corporation of Massachusetts
Filed June 15, 1959, Ser. No. 820,160
4 Claims. (Cl. 307—88)

This invention relates to a variable capacitor and more particularly to a semiconducting device having a capacitance that can be varied by an applied voltage.

It is well-known that a p-n junction in a semiconducting material exhibits a capacitance to an applied alternating voltage. That is, the alternating current flowing through the junction shows the phase shift with respect to applied voltage which is characteristic of a capacitor. It is also well-known that the capacitance varies with an applied D.C. bias voltage. If this bias voltage is in the blocking direction (the positive terminal connected to the n-type section and the negative terminal connected to the p-type section) the capacitance is related to the width of the space charge layer at the junction between the n- and p-type sections. An analysis of the capacity of the space charge layer is given by W. Shockley in an article entitled "The Theory of p-n Junctions in Semiconductors and p-n Junction Transistors," Bell Sys. Tech. J., 28, No. 3 435 (1949).

For bias voltages in the blocking direction, the width of the space charge layer varies with the bias voltage, and this causes a variation in capacitance. For an abrupt junction (a junction between a homogeneously doped n-region and a homogeneously doped p-region) the capacitance is voltage-dependent due to the change of the width of the space charge layer with change in the bias voltage. In an article entitled "A Variable-Capacitance Germanium Junction Diode for UHF," RCA Review, 17, No. 1, 68 (1956), L. J. Giacoletto and J. H. O'Connell describe the effect of variation of reverse bias voltage on a semiconductor junction. The authors point out that if a junction of two dissimilar semiconductors is biased in the reverse direction, the mobile charge carriers are moved away from the junction leaving uncompensated fixed charges in the region near the junction. The width and the electrical charge of this region (space charge layer) depends on the applied voltage and hence provides a voltage-variable capacitance.

In the case of impurity distributions other than the impurity distribution of an abrupt junction, the capacitance has a different relationship to the change in reverse bias voltage. While the capacitance of an abrupt junction varies inversely as the square root of the D.C. bias, the capacitance of a linearly changing impurity concentration junction varies inversely with the cube root of the bias voltage. An analysis of the impurity grading necessary to produce a specified transition capacitance variation (e.g. a linear variation of capacitance with bias voltage) is set forth in a paper entitled "Junction Capacitance and Related Characteristics Using Graded Impurity Semiconductors," by L. J. Giacoletto in IRE Trans. on Electron Devices ED-4, No. 3, 207 (1957).

It is advantageous to be able to produce a very rapid change of capacitance with applied D.C. bias. While the rate of change of capacity can be modified by altering the impurity distribution at the junction of the semiconductor, there is a practical limit imposed on this type of modification because of the difficulties encountered in the preparation of specific semiconductor impurity distribution. The semiconductive capacitor of this invention is capable of such a rapid change of capacitance as to make the device suitable for use in electronic tuning of RC circuits, or for use in parametric amplifiers of the type described by John Von Neumann in U.S. Letters Patent 2,815,488.

It is an object of this invention to provide a semiconducting junction type capacitor having an extremely rapid change of capacitance with applied bias voltage, wherein this rapid change arises from variations of the area of the junction and the width of the space charge layer.

It is another object of this invention to provide a semiconducting device exhibiting capacitance between two of its terminals, wherein this capacitance can be changed by an electric signal applied to a third terminal.

It is another object of this invention to provide a semiconducting capacitor having a capacitance that can be both increased and decreased with increase in the bias voltage in various regions of the bias voltage.

These and further objects of this invention will become more apparent upon consideration of the following description when read in conjunction with the accompanying drawings in which.

Figure 3:
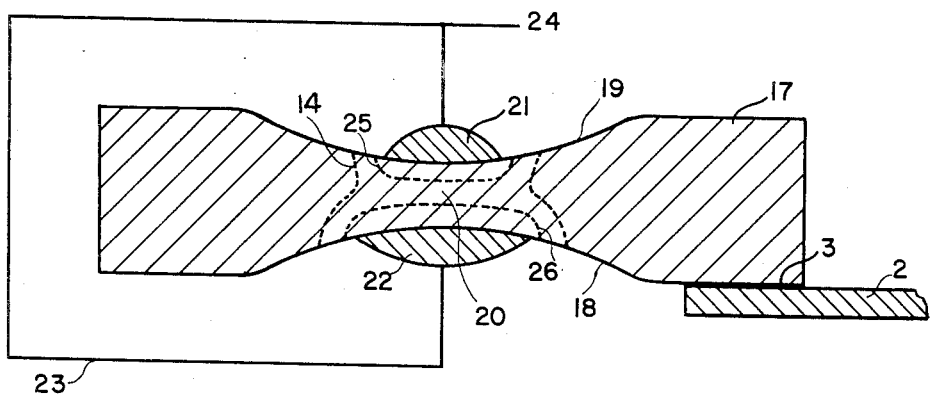
Figure 4:
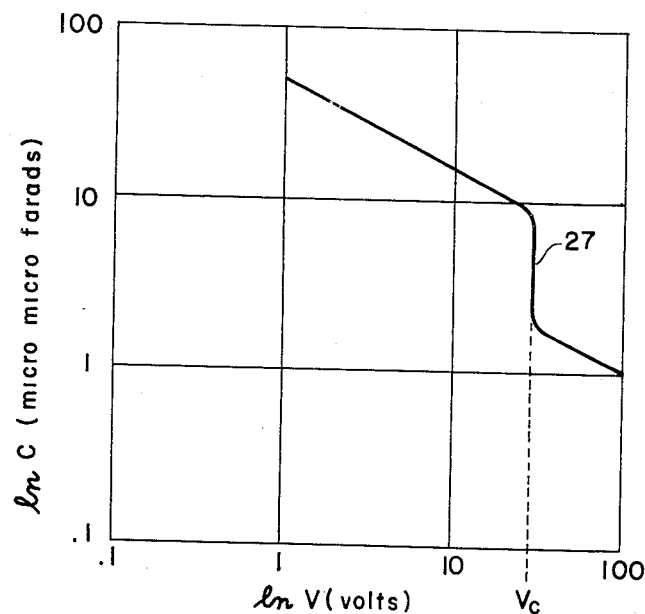
Figure 5:
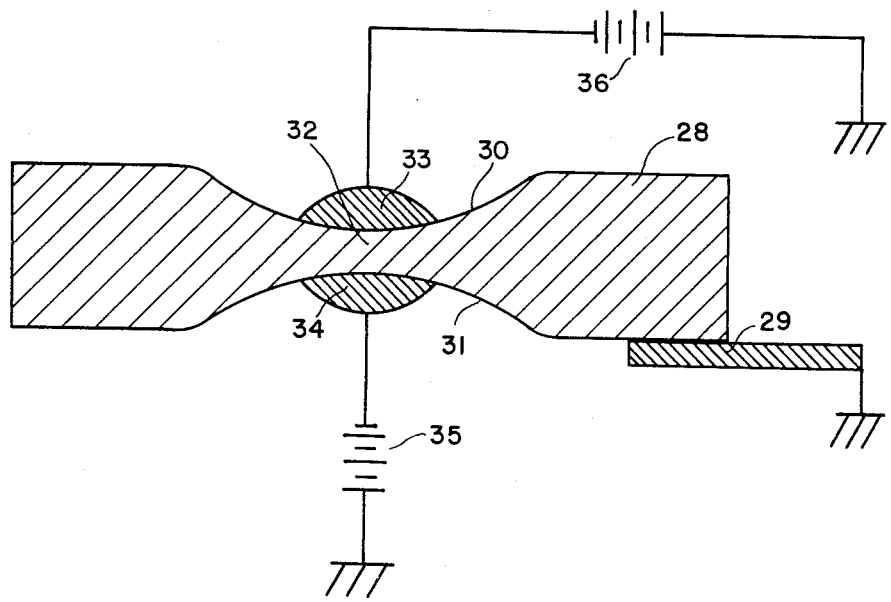
Figure 6:
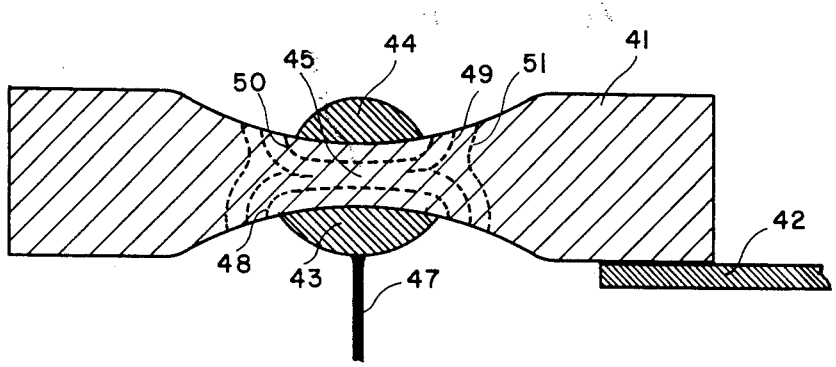
Figure 9:
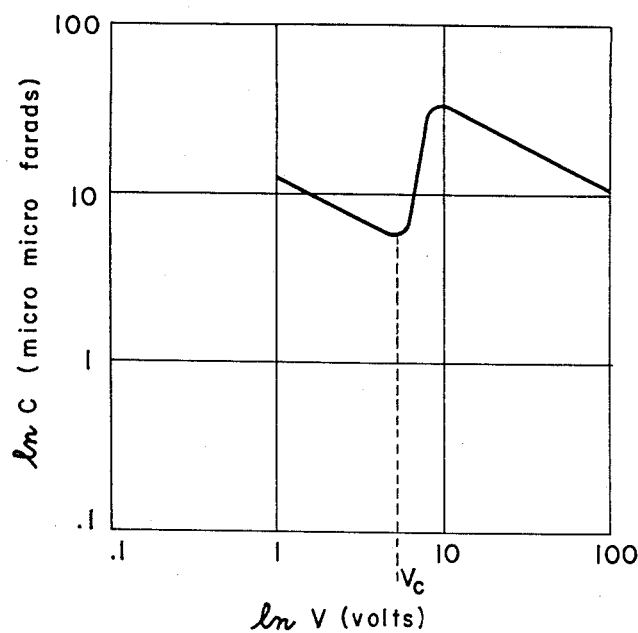
Figure 7:
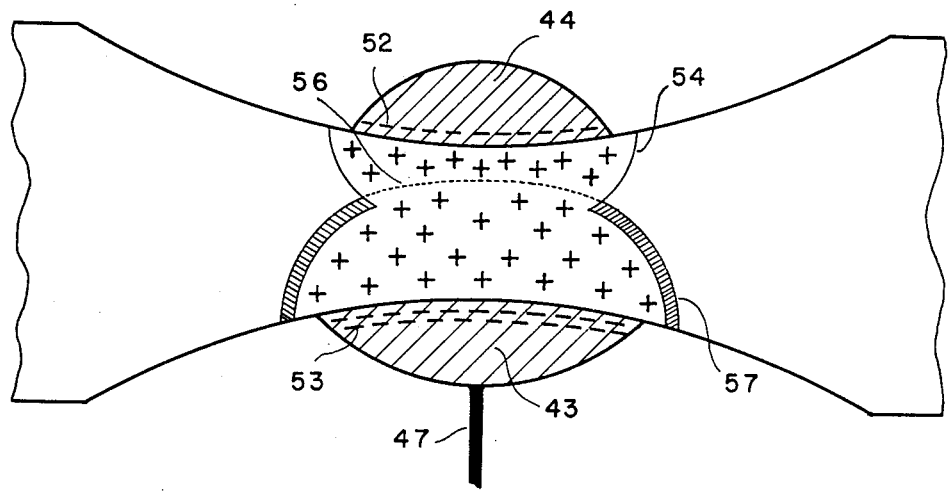
Figure 8:
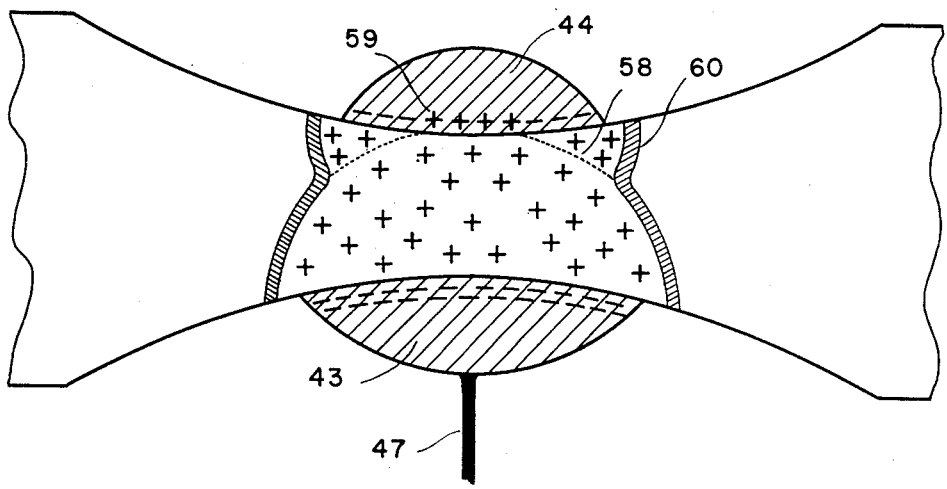

FIGURE 3 indicates a variable capacitor construction according to this invention, wherein the change in the area of the junction arises from the space charge layer being extended to another space charge layer;

FIGURE 4 is a graphic showing of the variation of capacitance with bias voltage obtained by the variable semiconductive capacitor of this invention that is shown in FIGURE 3;

FIGURE 5 shows another embodiment of a variable capacitor construction in acordance with this invention wherein the capacitance between two terminals is varied by a signal applied to a third terminal;

FIGURE 6 shows another embodiment of a variable semiconductor capacitor in accordance with this invention wherein the capacitance first passes through a minimum and then passes through a maximum with increasing bias voltage;

FIGURE 7 is a schematic showing of the electrical charge distribution in the device of FIGURE 6;

FIGURE 8 shows the charge distribution of FIGURE 7 at a higher bias voltage, that is, under a condition where punch-through has occurred; and FIGURE 9 is a graphic representation of a typical variation of capacitance with bias voltage for the device shown in FIGURE 6.

This invention concerns the use of a semiconductor space charge layer as a capacitance. It is well known to those skilled in the art that such a space charge layer can arise either at a p-n junction or at a rectifying metal contact. It is immaterial for the purpose of this invention whether the space charge layer arises from a p-n junction in the semiconductor or from a rectifying metal contact to the semiconductor. Since the following specification and drawings become somewhat simpler for the case of the rectifying metal contact, we shall adapt this type of space charge layer in what follows for the purpose of discussion. To be more specific, we shall discuss a rectifying contact to n-type germanium, which can be produced readily by plating of indium on the germanium.

Figure 1:
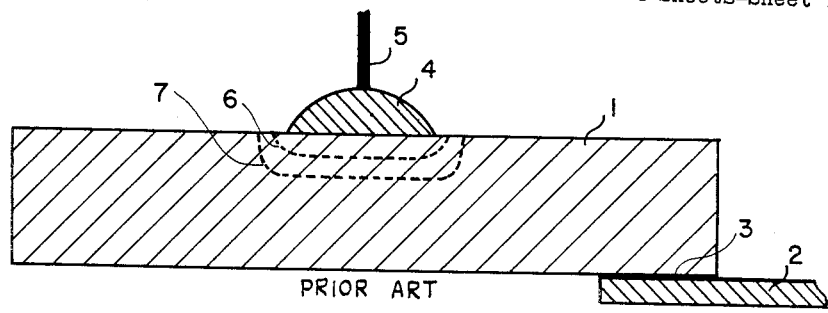
FIGURE 1 is a diagrammatic sectional view of a variable semiconductive capacitor in accordance with the prior art.

Reference is now made to FIGURE 1, which shows in cross-section a conventional type of variable semiconductive capacitor wherein 1 is a block of n-type germanium, 2 is a metal base lead, 3 is an ohmic contact between the metal base lead and the germanium, 4 is a rectifying metal contact to the germanium, 5 is a lead contact to rectifying metal contact 4, 6 is the boundary of the space charge layer at rectifying metal contact 4 for an applied voltage in the blocking direction, and 7 is the boundary of the space charge layer for another larger applied voltage in the blocking direction. Note that the relative change in the width $d$ of the space charge layer with bias voltage is much larger than the relative change in the area of the space charge layer. Accordingly, most of the variation of the capacitance in this device arises from the width; i.e. the factor $d$.

Figure 2:
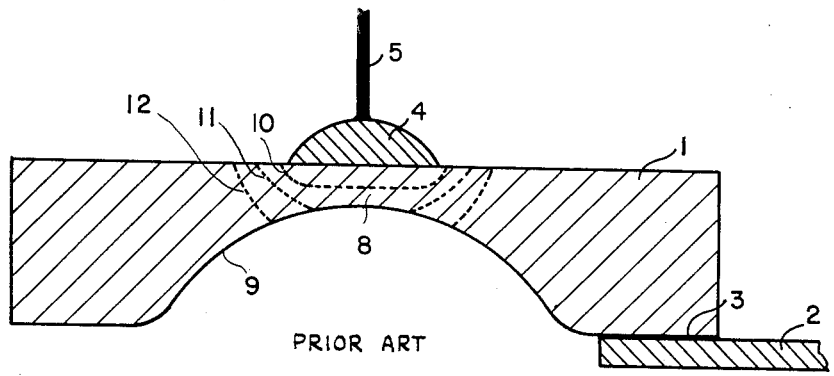
FIGURE 2 shows an improvement in prior art variable capacitor structure, wherein a change in the area of the junction arises from the space charge layer being extended to a surface of the device.

Reference is now made to FIGURE 2, which indicates a cross-section through an improved variable capacitor where both the width of the space charge layer and its area vary with the applied voltage. In FIGURE 2, a block 1 of n-type germanium now has a narrow web region 8, due to an indentation. The same type of ohmic and rectifying contacts as in FIGURE 1 are shown as 2, 3, 4, and 5. The dotted lines 10, 11, and 12 indicate the position of the boundary between the space charge layer and the bulk of the semiconductor for three increasingly higher bias voltages in the blocking direction. In the case of 11 and 12, the space charge layer protrudes through the entire narrow web region 8 and this leads to a substantial decrease of the area of the boundary between the space charge layer and the bulk of the semiconductor. The charges which constitute the capacitance C at a small alternating voltage appear on said boundary, and on the nearby portion of the rectifying metal contact. It is clear, therefore, that the decrease in the area of said boundary decreases the capacitance in accordance with the A-factor in the capacitance equation discussed by Giacoletto and O'Connell. It is easily visualized that the variation of the A-factor with applied potential depends on the curvature of the indentation 9.

It has been pointed out in the description of FIGURE 2 that a capacitor having a capacitance varying rapidly with the bias voltage can be made using a space charge layer in a semiconductor which protrudes towards a surface of the semiconductor. However, if the space charge layer "punches through" to a surface, a severe disadvantage is encountered; namely, the leakage current becomes quite high and becomes dependent on the state of the surface to which the space charge layer protrudes. This results in a sensitivity of the device to the ambient, and long-range instability and aging.

The capacitor shown in FIGURE 3 is constructed in accordance with this invention to overcome the disadvantages of the prior devices. FIGURE 3 describes an arrangement by which a rapidly varying capacitor is produced without the space charge layer punching through to a surface of the device. This is achieved by having two space charge layers in close vicinity of each other, and arranged in such a manner that the expansion of one or both space charge layers with applied bias leads to an overlap of the space charge regions, thereby reducing the area between at least one of the space charge layers and the bulk of the semiconductor.

FIGURE 3 shows a cross-section through a semiconducting device where 17 is a germanium wafer having two indentations 18 and 19 on opposite surfaces, whereby a narrow web region 20 is created which is shown in exaggerated proportion for the sake of clarity of discussion. On these opposing surfaces, there are two rectifying contacts 21 and 22 which are electrically connected externally by a lead 23 and are connected to one of the terminals 24 of the device; the other terminal is 2. Reference numerals 25 and 26 represent the boundaries of the two space charge layers of the rectifying contacts 21 and 22 for a bias voltage which is still sufficiently small that the space charge layers do not meet. 14 is the boundary of the space charge layer for a larger bias voltage where the two space charge layers 25 and 26 have met. It is easily seen that the sum of the areas of the boundary 25 and 26 is much larger than the area of 14, thereby leading to a substantial decrease in the capacitance as the bias voltage increases.

The FIGURE 4 curve shows the variation of capacitance with bias voltage for the configuration shown in FIGURE 3. Note the rapid drop 27 in the capacitance curve due to the overlap of the space charge layer when the critical voltage is exceeded. The shape of this drop can be controlled by the distribution of the web thickness, that is, by having the thickness change gradually with radial distance from the center of the indentations.

The arrangement of FIGURE 3 can be used as a two-terminal element; however, a small modification produces a three-terminal device, wherein the capacitance between two terminals is variable by the voltage applied to the third terminal. This device is shown in cross-section in FIGURE 5, wherein a block of semiconducting material 28 is provided with an ohmic contact 29; 30 and 31 are two indentations on opposite surfaces leaving a narrow web region 32; 33 and 34 are two rectifying contacts in these indentations to the semiconductor; and 35 and 36 are bias voltages applied in the blocking direction between the rectifying contacts and the "base terminal" 29. (In the case of an n-type semiconductor, the negative terminals of the batteries are connected to the rectifying contacts.) The bias voltage should be less than the voltage that produces "punch-through." That is, the voltage difference between the two rectifying contacts should be less than the "punch-through" voltage, described in detail below with reference to FIGURES 7 and 8.

The device operates as follows: The space charge layer at the rectifying contact 34 acts as a capacitance between the terminals 34 and 29. The magnitude of this capacitance can be varied by expanding the space charge layer at the contact 33 across the narrow web region 32 to meet the space charge layer at the contact 34. Thus the capacitance between the terminals 34 and 29 can be varied by the voltage applied between the terminals 33 and 29. Many important circuit applications such as electrtic frequency tuning, parametric amplification, etc., are possible with the device described as will be recognized by those skilled in the art.

For some applications, it is desirable to have a device with a capacitance which varies with the applied bias voltage in such a manner that the capacitance not only decreases with increasing bias voltages, but also increases with increasing bias voltages, and furthermore, exhibits a minimum and maximum of capacitance as the bias voltage increases. Such a device is shown in FIGURE 6 in cross-section. This device consists of a semiconducting piece of material 41 having an ohmic contact 42 and two rectifying contacts 43 and 44 on the opposite side of a narrow web region 45. The rectifying contact 44 is left floating, that is, no external lead is attached to this contact. The other rectifying contact 43 is connected to a lead 47 which represents one of the two terminals of the device, the other terminal being the base contact 42. Consider now that a bias voltage in the blocking direction is applied between 47 and 42. The boundary of the space charge layer at the contact 47 depends on the magnitude of this bias voltage; three such boundaries are indicated by the lines 48, 49, and 51. In the case of the bias voltage corresponding to the position 48 of the boundary, the space charge layer does not meet the space charge layer 50 at the other rectifying contact; while in the case of the higher bias voltages corresponding to the boundaries 49 and 51, the space charge layer has reached the other space charge layer. Thus in the case of the bias voltage 49, the area of the space charge layer is larger than in the case of the smaller bias voltage which corresponds to the boundary 48, while at still higher bias voltages in the blocking direction, the boundary of the space charge layers 51 of the rectifying contacts is again smaller than in the case of the boundary 49.

In order to better understand the performance of the device shown in FIGURE 6, it is necessary to consider the distribution of the electric field in the germanium between the rectifying contacts 43 and 44. This electric field arises from negative charges induced at the interface of the rectifying contacts with the germanium, and of positive charges in the space charge layers which arise from the ionized impurities which have been added to the semiconductor to make it n-type. Consider the applied bias voltage between the contacts 47 and 42 where the two space charge layers at the two rectifying contacts just meet; there is a point in the germanium web where the electric field is zero and this position is just where the two space charge layers meet each other. The electric field lines, which may be visualized as originating from the antimony impurities, point in opposite directions depending on whether the impurities are located between the above-mentioned point of zero field line and the rectifying contact 43, or between the above-mentionoed position of zero field and the rectifying contact 44. Let us now consider how the position of zero electric field shifts with an increasing bias voltage between the contacts 47 and 42. Reference is made to FIGURES 7 and 8 which indicate schematically the electric charges in the space charge layer between the two rectifying contacts. Layers 52 and 53 are layers of negative charge induced on the interface between the germanium and the rectifying contacts. The positions marked by a plus sign in the space charge layer indicate positive ionized impurities. The dotted line 56 indicates the position of zero electric field which separates electric field lines pointing in opposite directions. Only the part of the boundary of the space charge layer indicated by 57, and drawn heavily in the figure, contributes to the capacitance between the contacts 47 and 42 in FIGURE 6.

FIGURE 8 indicates a cross-section through the same device at a higher applied bias voltage between the contacts 47 and 42. Note that the dotted line 58 which indicates the position of zero electric field has now shifted toward the rectifying contact 44 and has even reached (at the narrowest position of the web) contact 44, inducing a positive charge 59 at part of the interface of the contact 44. This condition is well known under the name of "punch-through" in the transistor art. Under this condition, there is a very low electric impedance between the contacts 44 and 43 which can be visualized as an electric short and is equivalent, for electrical purposes, to an external metal connection between the contacts 43 and 44. The critical area determining the capacitance of the rectifying contact 43 is now not only the region 57, indicated in FIGURE 7, but the entire boundary of the space charge layer 60 indicated in FIGURE 8. That means that once punch-through occurs, the device acts as if the capacitance of the rectifying contact 44 has been switched in, in addition to the capacitance at the contact 43 which leads to an increase of the capacitance. The variation of capacitance which results from the device described in FIGURES 6, 7, and 8 is indicated in FIGURE 9 where the voltage $V_c$ indicates the critical voltage at which punch-through occurs. While the configuration of FIGURES 6, 7, and 8 would lead to only a comparatively small increase in capacitance, once punch-through occurs, a large increase in capacitance such as shown in FIGURE 9 would result if the area of the contact 44 were considerably larger, e.g. 10 times larger, than that of the contact 43.

It will be readily understood by those skilled in the art that the rate of change of capacitance with voltage is governed by the shape of the narrow web region, that is, the change of the width of the narrow web with radial distance from its center within the plane of the semiconductor slice.

We shall now describe a specific example for producing a structure such as shown in FIGURE 3. The germanium crystal is grown by well-known techniques from a melt doped with antimony to obtain an antimony concentration of $10^{16}$ cm.$^{-3}$ in the crystal; the resistivity of the crystal is 0.5 ohm cm. The crystal is sliced into sections approximately 8 mils thick, which are further lapped and etched to four mil thickness. Wafers 75 x 125 mils are then cut and soldered at one end to a nickel base tab using tin (95%)-antimony (5%) solder to obtain an ohmic contact.

Indentations are etched on opposite sides of the crystal using a jet of electrolyte having current passed through the jet whereby the germanium is made the anode. Inasmuch as the techniques of forming the narrow web are not part of this invention, reference is made to a paper by J. W. Tiley and R. A. Williams in Proc. IRE, 41, No. 12, 1706 (1953).

The web is kept at a thickness of 0.12 mil±0.02 by using optical transmission as a control of thickness during etching. The surfaces of the web have a gradual curvature. Indium is plated on both sides of the web by using a jet of electrolyte and making the germanium the cathode. The diameter of contact 21 is 5 mils and the diameter of contact 22 is 8 mils. Wires (½ mil nickel) are soldered to the indium platings using a tin-indium plate on the ends of the wires. A brief clean-up etch in KOH is given to the structure with the germanium made anode.

Test results on these units were obtained with applied bias voltages of from 1 volt to 10 volts. The capacitances obtained ranged from 5.5 mmfd. at 1 v. to 0.9 mmfd. at 10 v., with a sharp drop of capacitance, due to overlapping of the space charge layers, at biases greater than 5 volts.

It should be understood that the above-described embodiments of this invention are for purposes of illustration only, and that modifications may be made without departure from the spirit of this invention. It is intended that this invention be limited only by the scope of the appended claims.

What is claimed:

1. A variable capacitor comprising a semiconducting body, a narrow web in said body, rectifying contacts on opposite sides of said narrow web, space charge layers emanating from said rectifying contacts and in close proximity to each other, means to apply bias voltage in the blocking direction to at least one of said space charge layers, said bias voltage being of such magnitude that said space charge layers meet each other, whereby the capacitance of at least one of the space charge layers is significantly reduced.

2. A semiconducting device exhibiting a capacitance between two terminals which can be varied by an electric signal applied to a third terminal, said device comprising a semiconducting body, a narrow web in said body having a first space charge layer biased in the blocking direction, two terminals making electrical contacts to regions at opposite sides of said first space charge layer, a second space charge layer in close proximity to said first space charge layer, terminals to apply an electric signal to said second space charge layer of such a magnitude that said second space charge layer expands and meets said first space charge layer whereby the capacitance of said first space charge layer is reduced.

3. A semiconducting device exhibiting a capacitance which changes with the applied voltage in such a manner that the capacitance passes through a minimum and then through a maximum with increasing applied voltage, said device comprising a semi-conducting body having a narrow web containing two space charge layers in close proximity to each other, means to apply an electric bias in the blocking direction to one of said space charge layers, said bias of such magnitude that said space charge layer expands to meet said other space charge layer, whereby the capacitance becomes the sum of the capacitances of said two space charge layers once the applied bias voltage exceeds the punch-through voltage.

4. A semiconducting device having a capacitance variable with applied voltage, said device comprising a semiconducting body, a narrow web in said body, an ohmic contact to said body remote from said narrow web, a rectifying contact on each of the two faces of said narrow web, a space charge layer emanating from each of said rectifying contacts, circuit means including said ohmic contact and said space charge layers, an applied voltage in the blocking direction to one of said space charge layers of such magnitude that said one space charge layer expands and punches through to said other space charge layer, thereby causing a high conductance path between said two space charge layers to increase the capacitance of the device to the combined value of both space charge layers.

References Cited in the file of this patent

UNITED STATES PATENTS

| | | |
|---|---|---|
| 2,600,500 | Haynes et al. | June 17, 1952 |
| 2,672,528 | Shockley | Mar. 16, 1954 |
| 2,883,313 | Pankove | Apr. 21, 1959 |

FOREIGN PATENTS

| | | |
|---|---|---|
| 1,097,337 | France | Feb. 16, 1955 |